(12) United States Patent
Lilliebjerg

(10) Patent No.: US 7,370,186 B1
(45) Date of Patent: May 6, 2008

(54) MULTI-TASKING BOOTSTRAP SYSTEM AND METHOD

(75) Inventor: Erik Lilliebjerg, Higley, AZ (US)

(73) Assignee: NVIDIA Corporation, Santa Clara, CA (US)

( * ) Notice: Subject to any disclaimer, the term of this patent is extended or adjusted under 35 U.S.C. 154(b) by 208 days.

(21) Appl. No.: 10/726,234

(22) Filed: Dec. 1, 2003

(51) Int. Cl.
*G06F 9/00* (2006.01)
*G06F 9/24* (2006.01)
*G06F 15/177* (2006.01)

(52) U.S. Cl. ............................................. 713/1; 713/2
(58) Field of Classification Search ................... 713/1, 713/2
See application file for complete search history.

(56) References Cited

U.S. PATENT DOCUMENTS

| | | | | |
|---|---|---|---|---|
| 5,740,183 A | * | 4/1998 | Lowe | 714/736 |
| 5,797,003 A | * | 8/1998 | Voce | 713/2 |
| 6,016,554 A | * | 1/2000 | Skrovan et al. | 714/25 |
| 6,018,808 A | * | 1/2000 | Schieve | 714/36 |
| 6,330,583 B1 | * | 12/2001 | Reiffin | 718/105 |
| 7,149,823 B2 | * | 12/2006 | Miller et al. | 710/22 |

* cited by examiner

*Primary Examiner*—Rehana Perveen
*Assistant Examiner*—Michael J Brown

(57) ABSTRACT

A multi-task boot strap system and method for expediting boot up initialization processes are presented. In one embodiment, a multi-task boot strap method includes accessing interrupt vector table information stored in a non-volatile memory. For example, an interrupt vector table and corresponding interrupt service routine information associated with a system management (SM) bus controller operation are accessed from a read only memory (ROM). A program interrupt controller (PIC) is initialized to interpret the interrupt information from the non-volatile memory. This permits the operation of the system management bus controller to be performed in a multi-tasking environment (e.g., operating the SM bus controller in an interrupt mode). A processor can be configured to retrieve the boot up information (e.g., serial presence detect data) and process interrupts with interrupt service routine information retrieved from non-volatile memory. The processor can performing other multi-task operations while waiting for an interrupt during boot up operations.

20 Claims, 3 Drawing Sheets

MULTI-TASKING BOOTSTRAP SYSTEM AND METHOD

FIELD OF THE INVENTION

The present invention relates to the field of computer systems. In particular, the present invention relates to a system and method for performing multi-tasking operations during boot up of a computer system.

BACKGROUND OF THE INVENTION

Electronic systems and circuits have made a significant contribution towards the advancement of modern society and are utilized in a number of applications to achieve advantageous results. Numerous electronic technologies such as digital computers, audio devices, video equipment, and telephone systems have facilitated increased productivity and reduced costs in analyzing and communicating data in most areas of business, science, education and entertainment. Electronic systems providing these advantageous results often include systems that are started by a boot process. Properly booting up a system is often critical to proper system functionality. While the boot process is very important it can take some time to complete and other productive work is delayed.

The boot process typically causes a computer system to start executing instructions in a bootstrap loader program (e.g., a short machine language program). For example, personal computers often include boot instructions in a nonvolatile memory, such as a read only memory (ROM), that are automatically executed upon startup. A boot process is usually started by an indication the power is turned on for a computer system, a reset switch is pressed and/or a software restart instructions are executed. The bootstrap instructions typically include instructions for directing some hardware tests and initializations. The boot instructions also typically search for the location of the operating system instructions, load the operating system instructions and pass control to the operating system.

One of the first boot instructions usually executed are basic input/output system (BIOS) instructions. The BIOS software can usually direct the performance of a number of different functions. The BIOS is typically machine code that allows a processing unit to perform tasks such as initialization, diagnostics, loading the operating system Kernel from mass storage and routine input/output ("I/O") functions. Upon a bootstrap trigger event (e.g., power up), a processor typically boots up by fetching instruction code residing in the BIOS storage locations. The BIOS start up also usually involves performing a power on self-test (POST) for the various components included in the computer system to ensure everything is operating correctly. In addition to ensuring the individual components operate correctly the BIOS can make sure other chips, hard drives, ports and CPU function together. In some systems the BIOS also activates other BIOS chips on different cards installed in the computer system. For example, SCSI and graphics cards often have their own BIOS chips.

Traditionally systems execute instructions in polling mode during initialization. For example, systems typically initialize bus controllers and memories in a polling mode. As part of a typical computer system initialization, a processor attempts to retrieve serial presence detect data (SPD). However, the processor typically waits through numerous polling cycles for the information to be available.

As systems become more complex, bootstrap activities can become very involved and take longer to complete. In addition, applications are becoming more sophisticated and many modern systems and applications have boot up timing requirements that are getting shorter. Traditional boot up approaches often have difficulty meeting these timing requirements.

SUMMARY

A multi-tasking bootstrap system and method for expediting boot up initialization processes are presented. In one embodiment, a multi-tasking bootstrap method includes accessing interrupt vector table information stored in a non-volatile memory. For example, an interrupt vector table and corresponding interrupt service routine information associated with a system management (SM) bus controller operation are accessed from a read only memory (ROM). A program interrupt controller (PIC) is initialized to interpret the interrupt information from the non-volatile memory. This permits the operation of the system management bus controller to be performed in a multi-tasking environment (e.g., operating the SM bus controller in interrupt mode). For example, a processor can be configured to retrieve the boot up information (e.g., serial presence detect data) and process interrupts with interrupt service routine information retrieved from non-volatile memory. The processor can perform other multi-tasking operations (e.g., initialize a chipset, a general purpose input/output, timer controller, etc.) while waiting for an interrupt during boot up operations. For example, the processor can perform the multi-tasking operations while waiting for an interrupt associated with retrieving serial presence detect (SPD) data.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
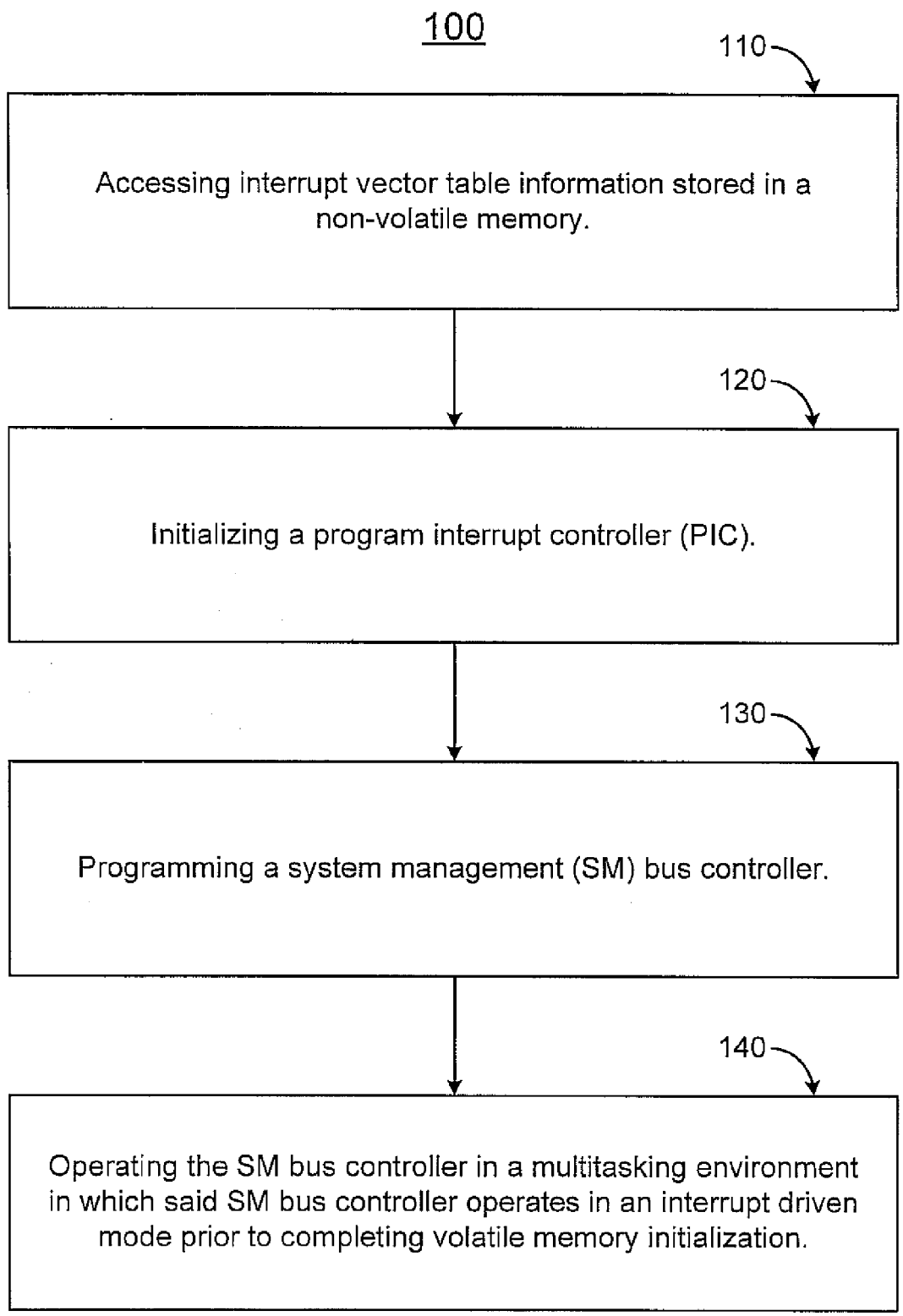
FIG. 1 is a flow chart of a multi-tasking bootstrap method in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a flow chart of multi-tasking bootstrap method 100 in accordance with one embodiment of the present invention. Multi-tasking bootstrap method 100 enables a system to perform multi-tasking operations during bootstrap start up operations. For example, a system can perform multi-tasking operations before completing the initialization of a volatile memory (e.g., a main memory). For example, a system can initialize a chipset (e.g., test hard ware bugs, insert static values in registers, etc.), put static information in registers (e.g., set up base registers with fixed addresses), initialize general purpose inputs/outputs (e.g., slam values for the GPIOs), initialize a direct memory access (DMA) controller, initialize a timer controller, initialize "super" IO (e.g. initialize a keyboard, mouse, communication ports, parallel ports, etc.), test checksums, initialize hardware monitoring devices, and partial processor initialization (e.g., MSRs).

In step 110, interrupt vector table information stored in a non-volatile memory is accessed. In one embodiment of the present invention, the non-volatile memory is a read only memory (ROM). A processor is initialized or setup so that it retrieves vector information from the interrupt vector table in non-volatile memory when interrupts are triggered. In one exemplary implementation, the processor can access the interrupt vector table information "pre-memory" initialization when a machine or system is started up, including before completing random access memory initialization. For example, as the processor (e.g., an X86 architecture processor) is performing initial basic input/output system (BIOS) operations, including during a power on self-test (POST), the processor can operate in interrupt mode prior to completing volatile memory initialization.

In step 120, a program interrupt controller (PIC) is initialized. In one exemplary implementation, initializing the PIC enables the system to operate in interrupt driven mode. The interrupt driven mode permits the system to begin a fetch operation (e.g., fetching information from memory) and proceed with other tasks while waiting for the information to be returned. The program interrupt controller directs the retrieval of interrupt service routine (ISR) information. For example, the program interrupt controller directs retrieval of interrupt service routine information from a read only memory (ROM). In one embodiment of the present invention, the PIC is initialized to retrieve the interrupt information from non-volatile memory.

In step 130, a system management (SM) bus controller is programmed. In one embodiment of the present invention, the SM bus controller programming includes initializing the SM bus controller. In one exemplary implementation, SM bus resources (e.g., a SM bus controller or interface) are assigned a base input/output (IO) address and operate as an IO device. For example, the SM bus resource addresses can be fixed (e.g., "slammed"). In one exemplary implementation, the BIOS sets up IO registers that actually control the SM bus controller. The registers can also be masked to indicate when the SM bus controller has something to report (e.g. a timeout, an error, no data available, etc.) and the mask can also cause the interrupt.

Step 140, the SM bus controller operates in a multitasking environment prior to completing volatile memory initialization. For example, the SM bus controller operates in an interrupt driven mode. Operating the SM bus controller includes retrieving serial presence detect data (SPD). In one exemplary implementation, operating the SM bus resources includes placing information describing volatile memory (e.g., SPD) in a predetermined location (e.g., of a processor cache). As the SM bus controller operations proceed, the processor performs multi-tasking operations. In one exemplary implementation, the BIOS provides a location where information retrieved under SM bus controller direction is located. For example, the BIOS provides a volatile memory (e.g., a processor cache)) location for storing parameter data and the amount of information located there.

Figure 2:
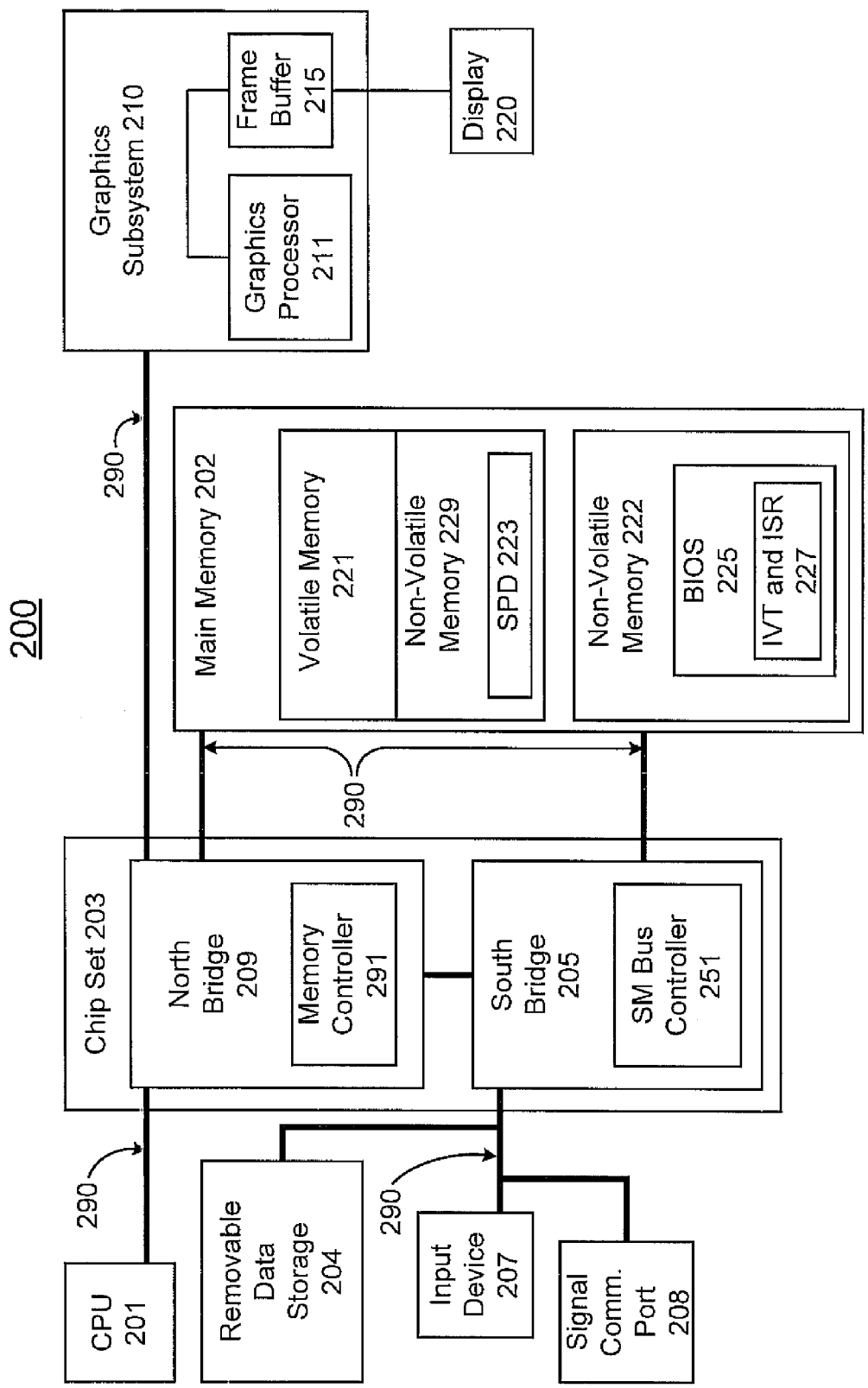
FIG. 2 is a block diagram of a computer system upon which the present invention can be implemented in accordance with one embodiment of a computer system.

FIG. 2 is a block diagram of a computer system 200, one embodiment of a computer system upon which the present invention can be implemented. Computer system 200 includes communication bus 290, central processor unit 201, main memory 202, chip set 203 with Northbridge 209 and Southbridge 205, removable data storage device 204, input device 207, signal communications port 208, and graphics subsystem 210 which is coupled to display 220. Communication bus 290 couples chipset 203 to central processor unit 201, main memory 202, removable data storage device 204, input device 207, signal communications port 208 and graphics subsystem 210. North bridge 209 includes a memory controller 291 and south bridge 205 includes system management (SM) bus controller 251. Main memory 202 includes a volatile memory 221, non-volatile memory 229 and non-volatile memory 222. Graphics subsystem 210 includes graphics processor 211 and graphics frame buffer 215.

The components of computer system 200 cooperatively operate to provide multi-tasking capabilities during boot up of the computer system 200. Communications bus 290 communicates information. Central processor 201 processes information. Main memory 202 stores information and instructions for the central processor 201. For example, non-volatile memory 229 stores serial presence detect (SPD) information 223 associated with volatile memory 221 and non-volatile memory 222 stores BIOS information 225 including interrupt vector table (IVT) and interrupt routine service (IRS) information 227. Removable data storage device 204 also stores information and instructions (e.g., functioning as a large information reservoir). Input device 206 provides a mechanism for inputting information and/or for pointing to or highlighting information on display 220. Signal communication port 208 provides a communication interface to exterior devices (e.g., a network interface). Display device 220 displays information in accordance with data stored in graphics buffer 215. Graphics processor 211 processes graphics commands from central processor 201 and provides the resulting data to graphics buffers 215 for storage and retrieval by display monitor 220.

Computer system 200 can perform multi-tasking operations even if the volatile memory 221 initialization is not complete. In one embodiment, central processor 201 is configured to retrieve boot up information from non-volatile memory 222, including retrieving information associated with an interrupt vector table, and perform multi-tasking operations while accessing serial presence detect information during boot up operations prior to completing volatile memory initialization.

For example, central processor 201 and graphics processor 211 are capable of executing other multi-tasking related instructions (e.g., instructions for initializing a chipset, a general purpose input/output, a timer controller, etc.) prior to completing initialization of the volatile memory 221. In one embodiment of the present invention, memory controller 291 of north bridge 209 and SM bus controller 251 of Southbridge 205 operate in interrupt mode from initial boot up. The interrupt vector table information is stored in non-volatile memory 222 and computer system 200 can continue to perform boot up operations even though initialization of volatile memory 221 is not completed.

It is appreciated that the present invention can be implemented in a variety of embodiments. In one exemplary implementation, the present invention can be utilized in processing systems that support a variety of graphics applications including video games. For example, the present invention can be utilized in boot processes of a game console, personal computer, personal digital assistant, cell phone or any number of platforms for implementing a video game. It is also appreciated that references to video game application implementations are exemplary and the present invention is not limited to these implementations.

Figure 3:
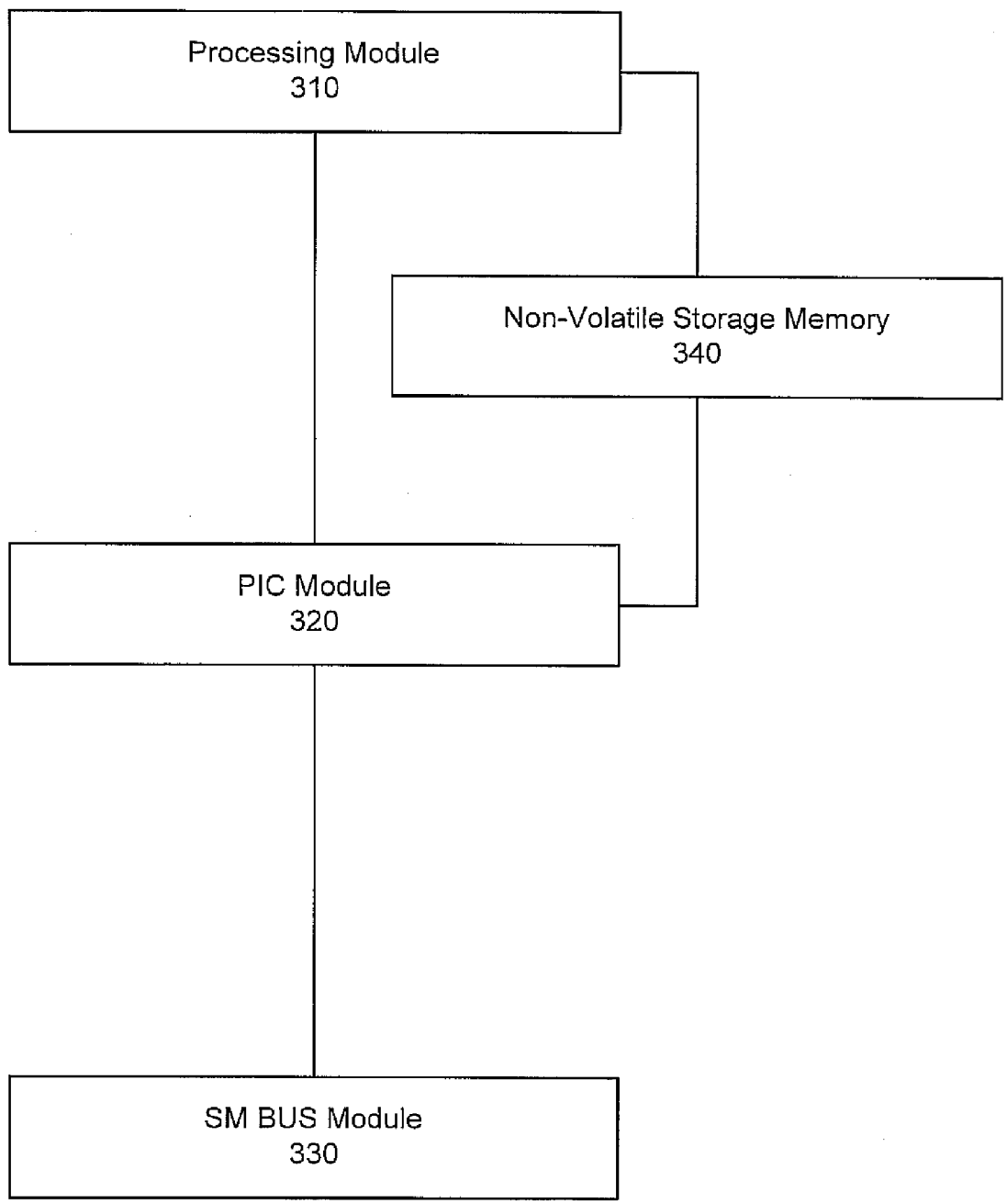
FIG. 3 is block diagram of a multi-tasking bootstrap architecture in accordance with one embodiment of the present invention.

FIG. 3 is block diagram of a multi-tasking bootstrap architecture 300 in accordance with one embodiment of the present invention. Multi-tasking bootstrap architecture 300 includes processing module 310, program interrupt controller (PIC) module 320, SM bus controller module 330, and non-volatile-storage module 340. When an interrupt is generated during boot up the interrupt goes to PIC module 320 which informs processing module 310 of an interrupt and utilizes an interrupt vector table in non-volatile storage module 340. The interrupt vector table defines which vector is assigned to which specific interrupt. The PIC module 320 informs processing module 310 where in non-volatile storage module 340 (e.g., ROM) the appropriate vector is located. When an interrupt fires, processing module 310 knows where in the non-volatile memory to retrieve the interrupt service routine instructions from and begins executing them. For example, if the address is at location X in the non-volatile memory the processing module 310 starts executing the code at location X to complete the interrupt processing. After completing the interrupt processing, processing module 310 resumes processing other tasks that were interrupted (e.g., resumes with executing other code).

In one embodiment, registers in the processor describe the IVT and the registers point to the ROM space where the IVT is located. This permits the IVT to be accessed even though a memory controller is not up and running yet and RAM (e.g., volatile memory 221) is not accessible. The address is known where the vectors for interrupts start so that when it receives an interrupt it jumps to the location in ROM and starts executing. For example, the SM bus controller (e.g., 204) or handler is programmed to have the interrupt vector table point to ROM (e.g., non-volatile memory 222) rather than the zero register of the RAM (e.g., volatile memory 221). In one embodiment, the pointer is a special instruction called LIDT and a portion of a processor cache is initialized to act as "temporary" memory for the stack. This initialization of the cache enables it to act as RAM for the stack until other RAM is initialized (e.g. volatile memory 221). The LIDT is an instruction in which the opcode or operand is a pointer that points to a table that describes the IVT. In one exemplary implementation, software code instructions include a LIDT call (e.g., with a 6 byte label) and further down in the code the LIDT "function" has the data that describes the IVT (e.g., the base address, the IVT size, etc.). In one embodiment the instructions are hard-coded.

One task the BIOS (e.g., BIOS 225) performs when starting or booting up a computer is to initialize volatile memories. In one embodiment, initializing a volatile memory includes retrieving volatile memory related initialization information (e.g., SPD 223) from a non-volatile memory (e.g., non-volatile memory 229) associated with the volatile memory. In one exemplary implementation, there is a space in non-volatile memory (e.g., non-volatile memory 229) that stores the serial presence detect data (e.g., SPD 223) which includes memory description information (e.g., storage capacity, memory speed, other parameters, etc.). The BIOS (e.g., BIOS 225) utilizes a system management (SM) bus controller (e.g., 204) to retrieve the SPD (e.g., SPD 223) and the SM bus controller operates in interrupt driven mode. This is possible since the interrupt vector table (IVT) addresses point into ROM (e.g., non-volatile memory 222) space addresses for the IVT (e.g., IVT and ISR 227) for the SM bus controller.

Thus, the present invention enables multi-tasking during boot up operations. This permits overall increased boot up execution speed because other tasks can be performed while waiting for various components (e.g., a SM bus controller) to be initialized. For example, when an SM bus controller is executing initialization tasks it is acquiring a data from a RAM and putting the information in a temporary cache. In accordance with the present invention, the processor is able to multi-tasking instead of constantly polling for feedback associated with getting the SM bus related data and fetching instructions for the next set of data. For example, a system can initialize a chipset (e.g., test hard ware bugs, insert static values in registers, etc.), put static information in registers (e.g., set up base registers with fixed addresses), initialize general purpose inputs/outputs (e.g., slam values for the GPIOs), initialize a direct memory access (DMA) controller, initialize a timer controller, initialize "super" 10 (e.g. initialize a keyboard, mouse, communication ports, parallel ports, etc.), test checksums, initialize hardware monitoring devices, and partial processor initialization (e.g., MSRs).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi-tasking bootstrap system comprising:
a bus for communicating information;
a non-volatile memory communicatively coupled to said bus, said non-volatile memory for storing boot up information including information associated with an interrupt vector table; and
a processor communicatively coupled to said non-volatile memory, said processor configured to retrieve said boot up information from said non-volatile memory, including retrieving said information associated with said interrupt vector table, and perform multi-tasking operations while accessing serial presence detect information during boot up operations prior to completing volatile memory initialization.

2. A multi-tasking bootstrap system of claim 1 wherein said non-volatile memory is a read only memory.

3. A multi-tasking bootstrap system of claim 1 wherein said bus is a system management bus.

4. A multi-task bootstrap system of claim 3 wherein communications via said system management bus are controlled by a system management bus controller operating in an interrupt driven mode.

5. A multi-tasking bootstrap system of claim 3 wherein said system management bus communicates serial presence detect data in accordance with directions from a system management bus controller operating in an interrupt driven mode.

6. A multi-tasking bootstrap system of claim 5 wherein said serial presence detect data includes memory description information.

7. A multi-tasking bootstrap system of claim 3 wherein said non-volatile memory includes basic input/output system instructions that direct said processor in performing an interrupt driven initialization of a volatile memory and multi-tasking operations between interrupt operations.

8. A multi-tasking bootstrap method comprising:
accessing interrupt vector table information stored in a non volatile memory;
initializing a program interrupt controller (PIC);
programming a system management bus controller; and
operating said system management bus controller in a multitasking environment in which said system management bus controller operates in an interrupt driven mode prior to completing volatile memory initialization, wherein said operating said system management bus controller includes retrieving serial presence detect data.

9. A multi-tasking bootstrap method of claim 8 wherein said interrupt vector table information is accessed when an interrupt indication is triggered.

10. A multi-tasking bootstrap method of claim 8 wherein said non-volatile memory is a read only memory (ROM).

11. A multi-tasking bootstrap method of claim 8 wherein said interrupt vector table information is accessed at a pre-memory initialization stage when a system is started up.

12. A multi-tasking bootstrap method of claim 11 wherein said interrupt vector table information is accessed before completing random access memory initialization.

13. A multi-tasking bootstrap method of claim 11 wherein said interrupt vector table information is accessed as a processor is performing initial basic input/output system operations (BIOS), including during a power on self test (POST).

14. A multi-tasking bootstrap method of claim 8 wherein said programming of said system management bus controller includes initializing said system management bus controller.

15. A multi-tasking bootstrap method of claim 8 wherein said system management bus programming includes slamming system management bus resource addresses.

16. A multi-tasking bootstrap method of claim 15 wherein multi-tasking operations are executed while processes for retrieving said serial presence detect data are performed.

17. A multi-tasking bootstrap method of claim 8 further comprising:
providing a location where serial presence detect data is located;
retrieving said serial presence detect data in an interrupt driven mode;
performing multi-tasking operations while waiting for said serial presence detect data to be retrieved; and
generating an interrupt when said serial presence detect data is retrieved.

18. A computer system comprising:
a display device coupled to a bus;
a non-volatile memory unit coupled to said bus; and
a processor coupled to said bus, said processor for executing a method of multitasking boot up initialization processes, said method comprising:
initializing said processor to access interrupt vector table information stored in said non-volatile memory unit;
initializing a program interrupt controller (PIC);
programming a system management bus controller; and
operating said system management bus controller in a multitasking environment in which said system management bus controller operates in an interrupt driven mode prior to completing volatile memory initialization, wherein said operating said system management bus controller includes retrieving serial presence detect data.

19. A multi-tasking bootstrap creation process of claim 18 further comprising:
providing a location where serial presence detect is located;
retrieving said serial presence detect data in an interrupt driven mode;
performing multi-tasking operations while waiting for said serial presence detect data to be retrieved; and
generating an interrupt when said serial presence detect data is retrieved.

20. A multi-tasking bootstrap creation process of claim 18 further comprising temporarily storing serial presence detect data in a processor cache.

* * * * *